(12) United States Patent
Hara et al.

(10) Patent No.: US 9,209,462 B2
(45) Date of Patent: Dec. 8, 2015

(54) NON-AQUEOUS ELECTROLYTE SOLUTION TYPE LITHIUM ION SECONDARY BATTERY

(75) Inventors: Tomitaro Hara, Okazaki (JP); Akira Tsujiko, Aichi-ken (JP); Sachie Yuasa, Okazaki (JP); Takahito Imamine, Nisshin (JP); Tsuyoshi Sasaki, Aichi-ken (JP); Yuichi Itou, Toyota (JP); Youji Takeuchi, Seto (JP); Osamu Hiruta, Nagoya (JP); Chikaaki Okuda, Nagoya (JP); Mamoru Mizutani, Owariasahi (JP); Hiroshi Sawada, Seto (JP)

(73) Assignees: Toyota Jidosha Kabushiki Kaisha, Toyota-shi, Aichi (JP); Kabushiki Kaisha Toyota Chuo Kenkyusho, Nagakute, Aichi (JP)

(*) Notice: Subject to any disclaimer, the term of this patent is extended or adjusted under 35 U.S.C. 154(b) by 774 days.

(21) Appl. No.: 13/501,102

(22) PCT Filed: Sep. 14, 2010

(86) PCT No.: PCT/JP2010/065832
§ 371 (c)(1),
(2), (4) Date: Nov. 14, 2012

(87) PCT Pub. No.: WO2011/046000
PCT Pub. Date: Apr. 21, 2011

(65) Prior Publication Data
US 2013/0059199 A1    Mar. 7, 2013

(30) Foreign Application Priority Data

Oct. 13, 2009 (JP) ................. 2009-236469

(51) Int. Cl.
H01M 4/58 (2010.01)
H01M 4/131 (2010.01)
H01M 4/36 (2006.01)
H01M 4/505 (2010.01)
H01M 4/525 (2010.01)
H01M 10/0525 (2010.01)

(52) U.S. Cl.
CPC ............ *H01M 4/5825* (2013.01); *H01M 4/131* (2013.01); *H01M 4/364* (2013.01); *H01M 4/505* (2013.01); *H01M 4/525* (2013.01); *H01M 10/0525* (2013.01); *H01M 2220/20* (2013.01); *Y02E 60/122* (2013.01); *Y02T 10/7011* (2013.01)

(58) Field of Classification Search
CPC ... H01M 4/5825; H01M 4/364; H01M 4/505; H01M 4/525; H01M 4/131; H01M 10/0525; H01M 2220/20; Y02E 60/122; Y02T 10/7011
See application file for complete search history.

(56) References Cited

U.S. PATENT DOCUMENTS

| | | | |
|---|---|---|---|
| 2006/0019151 A1 | 1/2006 | Imachi et al. | |
| 2007/0254209 A1* | 11/2007 | Baba et al. | ................... 429/129 |
| 2008/0193846 A1 | 8/2008 | Morishima | |

FOREIGN PATENT DOCUMENTS

| | | |
|---|---|---|
| CN | 101246957 | 8/2008 |
| CN | 101299470 | 11/2008 |
| JP | 2002-216755 | 8/2002 |
| JP | 2005-44722 | 2/2005 |
| JP | 2007-26676 | 2/2007 |
| JP | 2007-250299 | 9/2007 |
| JP | 2007-317534 | 12/2007 |
| JP | 2008-34218 | 2/2008 |
| JP | 2008-198596 | 8/2008 |
| JP | 2008/311067 | 12/2008 |
| WO | WO 2011/045848 | 4/2011 |

OTHER PUBLICATIONS

International Search Report in International Application No. PCT/JP2010/065832; Mailing Date: Nov. 16, 2010.

* cited by examiner

*Primary Examiner* — Laura Weiner
(74) *Attorney, Agent, or Firm* — Finnegan, Henderson, Farabow, Garrett & Dunner, LLP

(57) ABSTRACT

A lithium-ion secondary battery with excellent durability is provided using a two-phase coexisting compound as a positive electrode active material. This lithium-ion secondary battery is provided with an electrode body having a positive electrode containing a positive electrode active material and a negative electrode containing a negative electrode active material, and a non-aqueous electrolyte solution containing a lithium salt in an organic solvent. The positive electrode active material is mainly composed of a two-phase coexisting compound containing lithium, and also contains particles of a lithium-transition metal oxide with a layered structure. The particles of the layered oxide have an average particle diameter of 2 μm or less, and the percentage content thereof in the positive electrode active material is 5 mass % or less.

4 Claims, 3 Drawing Sheets

NON-AQUEOUS ELECTROLYTE SOLUTION TYPE LITHIUM ION SECONDARY BATTERY

TECHNICAL FIELD

The present invention relates to a lithium-ion secondary battery using a two-phase coexisting positive electrode active material.

This application is a national phase application of International Application No. PCT/JP2010/065832, filed Sep. 14, 2010, and claims the priority of Japanese Patent Application No. 2009-236469 submitted on Oct. 13, 2009, the contents of both of which are incorporated herein by reference.

BACKGROUND ART

Lithium-ion secondary batteries comprise positive and negative electrodes capable of reversibly storing and releasing lithium ions and an electrolyte sandwiched between the two electrodes, and are charged and discharged when lithium ions in the electrolyte move back and forth between the electrodes. They are popular as power sources for various portable devices and the like because they provide high energy densities with light weight. They are also promising in areas requiring large-capacity power sources, such as hybrid vehicles, electric cars and the like, and further improvements in safety and durability are expected. Patent Literature 1 and Patent Literature 2 are examples of technical literature relating to various improvements in the performance of lithium-ion secondary batteries.

CITATION LIST

Patent Literature

Patent Literature 1: Japanese Patent Application Laid-open No. 2007-317534
Patent Literature 2: Japanese Patent Application Laid-open No. 2008-34218

SUMMARY OF INVENTION

Olivine compounds, LiSicon compounds (also called NaSicon compounds) and other two-phase coexisting compounds (such as $LiFePO_4$, $Li_3Fe_2(PO_4)_3$ and the like) are gaining attention as positive electrode active materials providing improved battery safety. In these compounds, the oxygen atoms are in a strongly covalently bound state in the polyanions, and they promise to be safer as positive electrode materials because they are less likely to generate oxygen gas than lithium-transition metal composite oxides (lithium cobaltate and the like), which are ordinary, conventional positive electrode active materials. There is therefore demand for high-performance batteries which are lithium-ion secondary batteries using two-phase coexisting compounds as the positive electrode active material (hereunder sometimes called simply two-phase coexisting lithium-ion secondary batteries). For example, it would be advantageous to provide a two-phase coexisting lithium-ion secondary battery that underwent less performance loss (loss of charge-discharge cycle characteristics and the like) in endurance testing.

It is an object of the present invention to provide a lithium-ion secondary battery that has superior durability while using a two-phase coexisting compound as the positive electrode active material.

The inventors discovered that in some cases, two-phase coexisting lithium-ion secondary batteries undergo much greater performance loss (loss of charge-discharge cycle characteristics and the like) in endurance testing on the vehicular level than in endurance testing on a small device level. We also focused on the fact that a rapid voltage rise may occur at the end of charge in a two-phase coexisting lithium-ion secondary battery, and perfected the present invention after discovering that improved durability could be obtained by mitigating the voltage rise at the end of charge.

The lithium-ion secondary battery provided by the present invention comprises an electrode body having a positive electrode containing a positive electrode active material and a negative electrode containing a negative electrode active material, and a non-aqueous electrolyte solution containing a lithium salt in an organic solvent. The positive electrode active material is mainly composed of a two-phase coexisting compound containing lithium, and also contains particles of a lithium-transition metal oxide with a layered structure. The particles of the layered lithium-transition metal oxide (hereunder called the layered Li oxide) have an average particle diameter of 2 μm or less, and the percentage content thereof in the positive electrode active material is 5 mass % or less. The two-phase coexisting compound is a compound capable of reversibly storing and releasing lithium ions, wherein a phase containing a lithium ions and a phase containing no lithium ions can exist stably at the same time in the same crystal structure.

By thus adding a layered Li oxide to a two-phase coexisting compound as a positive electrode active material, it is possible to suppress battery deterioration by mitigating the voltage rise during the late stage of charging (when the SOC (State of Charge) is in the range of 50% to 100%: typically, at the end of charge when the SOC is 75% to 100%). It is thus possible to maintain capacity (discharge capacity) at a high level even after repeated charge-discharge cycles under severe conditions. Thus, with this configuration it is possible to provide a lithium-ion secondary battery having sufficient durability (charge-discharge cycle characteristics, etc.) to withstand vehicular applications and other applications in which the conditions of use are severe.

In a preferred embodiment of the lithium-ion secondary battery disclosed here, the two-phase coexisting compound is an olivine compound (compound having an olivine crystal structure) represented by General Formula (I): $Li_xFe_{1-y}M_yZO_4$, wherein M is at least one selected from Mn, Mg, Ni, Co, Cu, Zn, Ge, Cr, V, Nb, Mo, Ti and Ga, Z is P or Si, x satisfies $0.05 \leq x \leq 1.2$, and y satisfies $0 \leq y \leq 0.5$. Such positive electrode active materials containing inexpensive iron element are desirable from the standpoint of cost reduction.

In another preferred embodiment, the battery has the feature of maintaining a differential value dV/d (SOC) of 0.125 or less of an SOC-voltage curve within an SOC range of 50% to 100% in a voltage gradient measurement test in which the battery is charged from SOC 0% to SOC 100% at a constant current of 0.2 C and a temperature of 20° C. A two-phase coexisting lithium-ion secondary battery having this feature can provide improved durability by suitably mitigating the voltage rise at the end of charge.

In another preferred embodiment, the layered lithium-transition metal oxide particles have a composition represented by General Formula (II): $LiNi_{0.3+m}Mn_{0.3+n}Co_{0.4-m-n}O_2$, wherein m satisfies $0 \leq m \leq 0.4$ and n satisfies $0 \leq n \leq 0.4$. Because this three-element composite oxide is less expensive to manufacture than lithium cobaltate and lithium nickelate, it can provide a less expensive lithium-ion secondary battery with superior charge-discharge cycle characteristics.

Moreover, because the lithium-ion secondary battery disclosed here uses a layered Li oxide together with a two-phase coexisting compound as the positive electrode active material, it is suitable as a vehicle-mounted battery because it can exhibit superior durability with respect to charge-discharge cycles under severe conditions (rapid charge-discharge and the like). Thus, another aspect of the present invention provides a vehicle equipped with the lithium-ion secondary battery disclosed here.

DESCRIPTION OF EMBODIMENTS

Preferred embodiments of the present invention are explained below. Matters not specifically mentioned in this Description that are necessary for implementing the present invention can be understood as design matters by a person skilled in the art based on prior art in the field. The present invention can be carried out based on the content disclosed in this Description and technical common knowledge in the field.

The technology disclosed here can be applied to a lithium-ion secondary battery provided with a positive electrode that contains, as a positive electrode active material, a two-phase coexisting compound capable of reversibly storing and releasing lithium. The outer shape of this secondary battery can be changed appropriately according to the application, with no particular limitations, but for example the outer shape may be oblong, flat, cylindrical or the like. The shape of an electrode body comprising the positive electrode may differ according to the shape and the like of the secondary battery, without any particular limitations. For example, an electrode body comprising sheet-shaped positive and negative electrodes wound together with separators can be adopted by preference.

Figure 1:
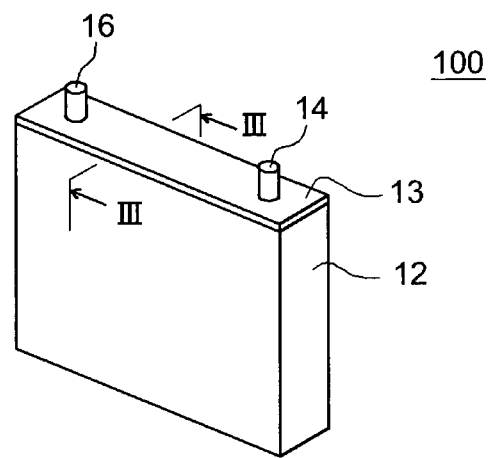
FIG. 1 is a schematic perspective view showing a battery of one embodiment.

The present invention is explained in more detail below with reference to the views of FIGS. 1 to 3, using an embodiment of a lithium-ion secondary battery provided with such a wound electrode body, but applications of the present invention are not limited to this battery. As shown in the drawings, a lithium-ion secondary battery 100 of this embodiment comprises metal (although resin or laminate film is also desirable) housing 12. This housing 12 contains a wound electrode body 20, which is constructed by layering a long thin positive electrode sheet 30, separator 50A, negative electrode sheet 40 and separator 50B in that order, and winding them into a flat roll.

The positive electrode sheet 30 can be prepared by coating and drying a positive electrode mix on at least one side (preferably both sides) of a positive electrode collector 32 to form a positive mix layer 35. A paste or slurry composition comprising a positive electrode active material dispersed in a suitable solvent together with a conductive material, a binder and the like as necessary can be used as the positive electrode mix.

A conductive member made of a metal material with good electrical conductivity is used as the positive electrode collector 32. For example, aluminum or an alloy composed mainly of aluminum can be used. The shape of the positive electrode collector may differ depending on the shape and the like of the lithium-ion secondary battery, without any particular limitation, but bar, plate, sheet, foil, mesh and various other forms are possible. A sheet-shaped positive electrode collector can be used by preference in this embodiment.

This positive electrode active material is mainly composed of a two-phase coexisting compound capable of reversibly storing and releasing lithium. For example, it may contain 1 or 2 or more selected from the olivine compounds, LiSicon compounds and the like. An olivine compound represented by the following General Formula (I) is preferred:

$$Li_xFe_{1-y}M_yZO_4 \quad (I).$$

In General Formula (I), M is at least one selected from Mn, Mg, Ni, Co, Cu, Zn, Ge, Cr, V, Nb, Mo, Ti and Ga, Z is P or Si, x satisfies $0.05 \leq x \leq 1.2$, and y satisfies $0 \leq y \leq 0.5$. Specific examples of this olivine compound include $LiFePO_4$, $Li_2FeSiO_4$, $LiFe_{0.5}Mn_{0.5}PO_4$, $LiCo_{0.5}Fe_{0.5}PO_4$, $LiNi_{0.5}Fe_{0.5}PO_4$ and the like. $LiFePO_4$ is a particularly desirable example. Examples of LiSicon compounds include $Li_3Fe_2(PO_4)_3$, $Li_2ZnGeO_4$ and the like.

Compounds manufactured or produced by known conventional methods can be used as these two-phase coexisting compounds. For example, one prepared in powder form with an average particle diameter of about 0.2 μm to 10 μm can be used by preference.

The compounded amount of the two-phase coexisting compound in the positive electrode active material is about 95 mass % or more. The compounded amount is preferably about 97 mass % or more, or more preferably about 98 mass % or more.

In addition to the two-phase coexisting compound, the positive electrode active material also comprises 1 or 2 or more of various lithium-transition metal oxides that have layered structures and are capable of reversibly storing and releasing lithium. These layered Li oxides can be various lithium-transition metal oxides with layered structures that are used in the positive electrodes of ordinary lithium-ion secondary batteries. Examples of such layered Li oxides include oxides containing at least nickel (nickel-containing lithium composite oxides), oxides containing at least cobalt, and oxides containing at least manganese as the transition metal.

A nickel-containing lithium composite oxide (hereunder called a layered LiNi oxide) is a desirable example of a lithium-transition metal oxide with a layered structure. This layered LiNi oxide may also contain 1 or 2 or more metal elements (that is, transition metal elements and/or typical metal elements) in addition to Li and Ni. For example, it may contain 1 or 2 or more selected from the group consisting of Mn, Co, Mg and Al in addition to Li and Ni. One in which Ni is the principal component of the transition metal elements, or in which Ni and 1 or 2 or more transition metal elements (such as Mn and Co) are included in roughly the same proportions, is desirable. An example of a particularly desirable layered LiNi oxide is the oxide represented by General Formula (II) below:

$$LiNi_{0.3+m}Mn_{0.3+n}Co_{0.4-m-n}O_2 \quad (II).$$

In General Formula (II), m satisfies $0 \leq m \leq 0.4$ and n satisfies $0 \leq n \leq 0.4$. A desirable example is $LiNi_{1/3}Mn_{1/3}Co_{1/3}O_2$, which contains Ni, Mn and Co in roughly equal proportions.

A powdered oxide with an average particle diameter of 2 μm or less is used as the layered Li oxide in the positive electrode of the lithium-ion secondary battery disclosed here. The preferred average particle diameter of the layered Li oxide particles is 1.5 μm or less, and for example one with a diameter of about 1 μm or less can be used by preference. There is no particular lower limit on the average particle diameter, but normally it is desirable to use layered Li oxide particles with an average particle diameter of 0.1 μm or more.

The compounded amount of the layered Li oxide in the positive electrode active material is about 5 mass % or less. This compounded amount is preferably 3 mass % or less or more preferably 2 mass % or less, and may be about 1 mass % or even less. If the amount is too large, the advantage of having a two-phase coexisting compound as the principal component of the positive electrode active material may be lost. There is no particular lower limit on the compounded amount of the layered Li oxide, but normally 0.1 mass % or more is preferred. If the amount is too little, it is difficult to obtain a sufficient mitigating effect on the voltage rise. For example, if $LiFePO_4$ is used as the two-phase coexisting compound and $LiNi_{1/3}Mn_{1/3}Co_{1/3}O_2$ as the layered Li oxide, the compounded amounts thereof may be selected appropriately within the aforementioned ranges.

In a preferred embodiment, the average particle diameter and compounded amount of the layered Li oxide particles are set so as to obtain a battery with the preferred dV/d (SOC) as discussed below. With this configuration, it is possible to effectively mitigate the rapid voltage rise at the end of charge by using a small amount of layered Li oxide particles in addition to a two-phase coexisting compound. This improves the durability of the battery. When using a layered Li oxide particles of ordinary size (typically about 10 μm or more), the advantages of using the two-phase coexisting compound as an active material (voltage constancy during charge and discharge, improved safety, etc.) tend to be spoiled if the amount of layered Li oxide particles is increased. If the amount of layered Li oxide particles is reduced, on the other hand, a satisfactory rapid voltage rise mitigation effect becomes more difficult to achieve. With the configuration of the present invention, a good voltage rise mitigation effect can be obtained by adding a small quantity of the layered Li oxide particles because the particles have a small average particle diameter. Consequently, the advantages of using a two-phase coexisting compound as the positive electrode active material can be fully exploited to improve the durability of the battery.

Figure 4:
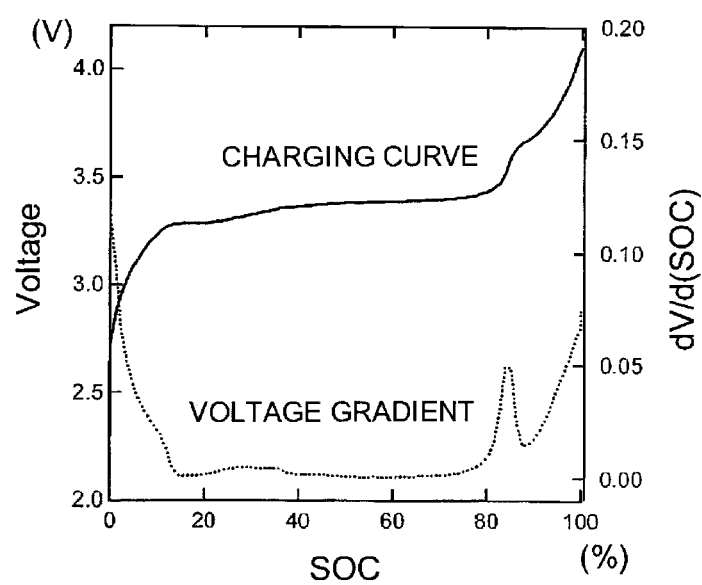
FIG. 4 is a graph showing the charging curve and voltage gradient of the battery of Example 5.

In the lithium-ion secondary battery disclosed here, because a two-phase coexisting compound and layered Li oxide particles are included as positive electrode active materials, the voltage rises gently in stages beginning about halfway through the late stage of charging (for example, at SOC 80%), and a "shoulder" indicating a gentle voltage rise appears about halfway through the late stage of charging (for example, the part around SOC 85% in the charging curve of FIG. 4) in the charging curve (the graph showing changes in voltage against changes in SOC). More specifically, the lithium-ion secondary battery disclosed here may have the feature of a differential value dV/d (SOC) (hereunder called the voltage gradient) of 0.125 (here and below, in V/%) or less (or preferably 0.10 or less) of the charging curve at the late stage of charging. In a lithium-ion secondary battery having this feature, capacity deterioration is controlled because the voltage rise at the end of charge is gradual.

In another aspect, the technology disclosed here encompasses a lithium-ion secondary battery provided with a positive electrode comprising a positive electrode active material having a lithium-containing two-phase coexisting compound as a principal component, and constructed so that the differential value dV/d (SOC) of the charging curve (which shows the change in voltage against the rise in SOC) is 0.125 or less (V/%) within the SOC range of 50% to 100% in a voltage gradient measurement test in which the battery is charged from SOC 0% to SOC 100% at a constant current of 0.2 C and a temperature of 20° C. The differential value is preferably 0.10 or less. In particular, the battery is preferably constructed so that the differential value is 0.125 or less (preferably 0.10 or less) at the end of charge (near SOC 100%, such as a range of SOC 80% or more). A two-phase coexisting lithium-ion secondary battery having this charging characteristic may have greater durability because the rapid voltage rise at the end of charge is mitigated.

Thus, a technology that can provide this characteristic can preferably be applied for example to a two-phase coexisting lithium-ion secondary battery in which the differential value will exceed 0.125 (typically near SOC 100%) if no layered Li oxide particles are included. Lowering the dV/d (SOC) at the end of charge by using a positive electrode active material configuration containing layered Li oxide particles such as the aforementioned is of particular significance in such a secondary battery. In a two-phase lithium-ion secondary battery of this configuration, the voltage rises gently in stages beginning about halfway through the late stage of charging (for example, at SOC 80%) in the aforementioned voltage gradient measurement test, and a "shoulder" (for example, the part around SOC 85% in the charging curve of FIG. 4) appears in the charging curve to indicate this gradual voltage rise. Thus, in this battery the differential value may be 0.125 or less (preferably 0.10 or less) even in the late stage of charging (that is, in the region of SOC 50% to SOC 100%).

One possible way to protect the battery by preventing a rapid voltage rise at the end of charge is by using a device that automatically terminates charging when the voltage reaches a predetermined upper limit Even with such a system in place, however, if the voltage rise at the end of charge is too rapid as in a two-phase coexisting lithium-ion secondary battery, the instantaneous voltage gradient immediately before automatic termination of charging may be too great, and partial overcharge regions and the like are likely to be generated leading to severe battery deterioration. Thus, a gentle voltage rise at the end of charge is desirable even in a two-phase coexisting lithium-ion secondary battery having such a system.

When this battery protection system is used, moreover, it is desirable that the SOC level at which the aforementioned "shoulder" appears in the charging curve be as high as possible (that is, as close as possible to SOC 100%), and that the SOC region in which charging progresses with a roughly flat voltage (that is, with a roughly zero voltage gradient) last as long as possible so that more electricity can be charged before the predetermined voltage is reached and charging is automatically terminated. For example, by using a layered Li oxide with a smaller average particle diameter (on the sub-micron level (less than 1 μm) for example), it is possible to increase the efficiency of the voltage rise mitigation effect, achieve excellent durability with a smaller compounded amount (preferably less than 1 mass %, such as about 0.4 mass %), and increase the amount of electricity that can be charged.

A conductive powder material such as carbon powder or carbon fiber is preferably used as the conductive material that is optionally included in the positive electrode mix. Desirable examples of carbon powder include various kinds of carbon black, such as acetylene black, furnace black, Ketjen black, graphite powder and the like. One conductive material may be used alone, or 2 or more may be used in combination. The amount of the conductive material contained in the positive electrode mix can be selected appropriately according to the kind and amount of the positive electrode active material.

Instead of using a conductive material, or in combination with a conductive material, the particle surfaces of the positive electrode active material can be treated to increase electrical conductivity. For example, particles that have been given a surface carbon coating by known methods can be used favorably.

A water-soluble polymer that dissolves in water, a polymer that disperses in water, or a polymer that dissolves in a non-aqueous solvent (organic solvent) or the like for example can be selected appropriately as the binder (which can also be seen as a viscosity improver). One kind can be used alone, or 2 or more can be used in combination.

Examples of water-soluble polymers include carboxymethyl cellulose (CMC), methyl cellulose (MC), cellulose acetate phthalate (CAP), hydroxypropyl methyl cellulose (HPMC), hydroxypropyl methyl cellulose phthalate (HP-MCP), polyvinyl alcohol (PVA) and the like.

Examples of water-dispersible polymers include polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE) and other fluorine resins, vinyl acetate copolymer, styrene butadiene block copolymer (SBR), acrylic acid-denatured SBR resin (SBR latex), gum arabic and other gums and the like.

Polymers that dissolve in non-aqueous solvents (organic solvents) include polyvinylidene fluoride (PVDF), polyvinylidene chloride (PVDC), polyethylene oxide (PEO), polypropylene oxide (PPO), polyethylene oxide-propylene oxide copolymer (PEO-PPO) and the like.

The added amount of the binder can be selected appropriately according to the kind and amount of the positive electrode active material.

The negative electrode sheet 40 that makes up the electrode body 20 together with the positive electrode sheet 30 can be prepared for example by coating and drying a negative electrode mix on at least one side (preferably both sides) of a negative electrode collector 42 to form a negative mix layer 45.

A paste or slurry composition comprising the negative electrode active material dispersed in a suitable solvent together with 1 or 2 or more binders or the like as necessary can be used as the negative electrode mix.

A conductive member made of a metal with good electrical conductivity is preferably used as the negative electrode collector 42. For example, copper or an alloy mainly composed of copper can be used. The shape of the negative electrode collector 42 may also differ according to the shape of the lithium-ion secondary battery and the like, without any particular limitations, but bar, plate, sheet, foil, mesh and various other forms are possible. A sheet-shaped copper negative electrode collector 42 is used in this embodiment, and can be used favorably in a lithium-ion secondary battery 100 provided with a wound electrode body 20.

1 or 2 or more substances conventionally used in lithium-ion secondary batteries can be used as the negative electrode active material, without any particular limitations. Desirable examples of suitable negative electrode active materials include carbon particles. A desirable example of a negative electrode active material is a particulate carbon material (carbon particles) containing a graphite structure (layered structure) in at least part of the material. A graphite material, hard carbon material or soft carbon material or a carbon material having a combination of these structures can be used by preference. Of these, natural graphite or other graphite particles can be used by preference.

1 binder or a combination of 2 or more binders similar to those described above for the positive electrode can be used as the binder (which may be seen as a viscosity improver). The added amount of the binder can be selected appropriately according to the type and amount of the negative electrode active material.

Porous films made of a polyolefin resin such as polyethylene or polypropylene can preferably be used for separators 50A and 50B, which are superimposed with positive electrode sheet 30 and negative electrode sheet 40. These films may be single-layer films or multilayer films. The two separators 50A and 50B may be of the same kind or of different kinds.

Figure 2:
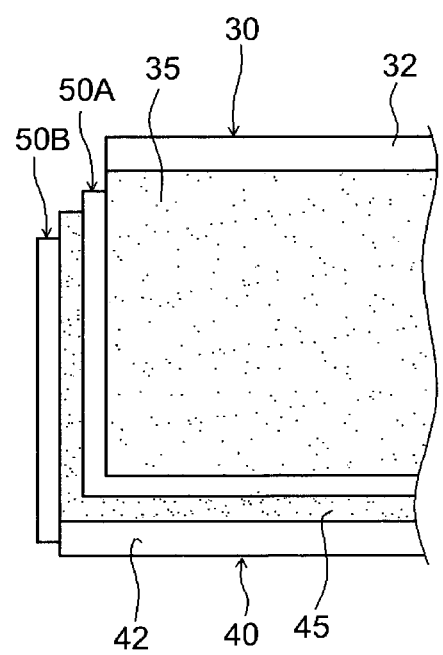
FIG. 2 is a schematic plane view showing the positive and negative electrodes and separators of a battery of one embodiment.
Figure 3:
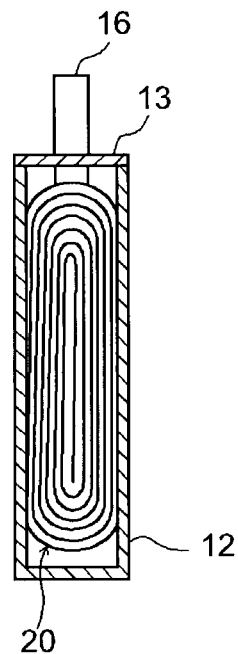
FIG. 3 shows the III-III cross-section in FIG. 1.

As shown in FIG. 2, the positive mix layer 35 is not formed (or is formed and then removed) along a first edge of the positive electrode sheet 30 extending in the lengthwise direction, exposing positive electrode collector 32. Similarly, the negative electrode collector 42 is exposed along a first edge in negative electrode sheet 40. When the positive and negative electrode sheets 30 and 40 are superimposed together with separators 50A and 50B to form a layered body, the first edge of the positive electrode sheet (exposed part of the positive electrode collector) and the first edge of the negative electrode sheet (exposed part of the negative electrode collector) are arranged symmetrically on either side of the lengthwise axis of the layered body, and the positive electrode sheets 30 and 40 are offset somewhat with mix layers 35 and 45 overlapping. This layered body is wound, and the resulting wound body is flattened from the side to obtain a flat, wound electrode body 20.

The resulting wound electrode body 20 is contained in a housing 12 (FIG. 3), and the exposed part of the positive electrode collector 32 is connected electrically to an external positive connection terminal 14 while the exposed part of the negative electrode collector 42 is connected to an external negative connection terminal 16. These terminals are partly disposed outside of housing 12. A non-aqueous electrolyte solution is then disposed (injected) into the housing 12, and the opening of the housing 12 is sealed by welding or the like of the housing with the corresponding lid member 13, completing assembly of the lithium-ion secondary battery 100. The sealing of the housing 12 and injection of the electrolyte solution can be accomplished by methods similar to those used in manufacturing conventional lithium-ion secondary batteries.

The non-aqueous electrolyte solution can be prepared by dissolving a suitable electrolyte in an organic solvent. An electrolyte used in ordinary lithium-ion secondary batteries can be used as the electrolyte, without any particular limitations. For example, 1 or 2 or more lithium salts selected from $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$ and the like can be used. The concentration of the electrolyte in the electrolyte solution is not particularly limited, and can be similar to the concentration of an electrolyte solution in a conventional lithium-ion secondary battery for example. Various additives and the like can also be added to the electrolyte solution in addition to the electrolyte.

A carbonate, ester, ether, nitrile, sulfone, lactone or other aprotic solvent can be used favorably as the organic solvent (non-aqueous solvent) used in the non-aqueous electrolyte solution. Examples include ethylene carbonate (EC), propylene carbonate (PC), diethylene carbonate (DEC), dimethyl carbonate (DMC), ethylmethyl carbonate (EMC), 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, gamma-butyrolactone (BL) and other organic solvents commonly used in lithium-ion secondary batteries, and 1 of these may be used alone, or 2 or more may be used in combination.

As discussed above, the two-phase coexisting compound can maintain its crystal structure while having two stably co-existing phases, a phase containing no lithium ions (such as $FePO_4$) and a phase containing lithium ions (such as $LiFePO_4$). That is, there is almost no diffusion of lithium ions between the lithium ion-containing phase and the lithium ion-free phase in the crystals of the two-phase coexisting compound, and the potential can be almost constant during charge and discharge because there is no intermediate phase containing dispersed lithium ions. Thus, this can be a stable power source even for vehicles, wind power generation and other uses involving repeated input and output with irregular depth and rate. Moreover, because the crystal structure does not break down even if most of the lithium ions are released, the effective capacity (actual amount of ions that can be used reversibly) may be roughly equivalent to the theoretical capacity, and the capacity may be equivalent to that of a conventional lithium-ion secondary battery. As a result, in addition to the safety obtained by using the two-phase coexisting compound, these characteristics make the two-phase coexisting lithium-ion secondary battery suitable for automotive applications.

Figure 5:
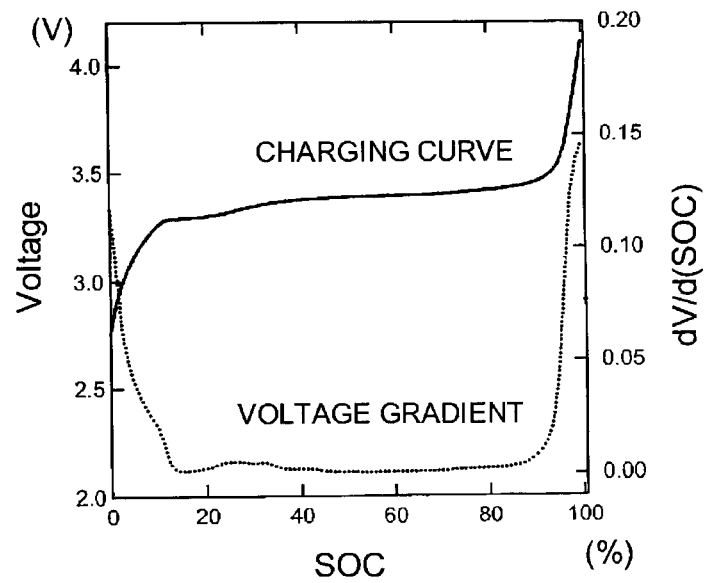
FIG. 5 is a graph showing the charging curve and voltage gradient of the battery of Example 9.
Figure 6:
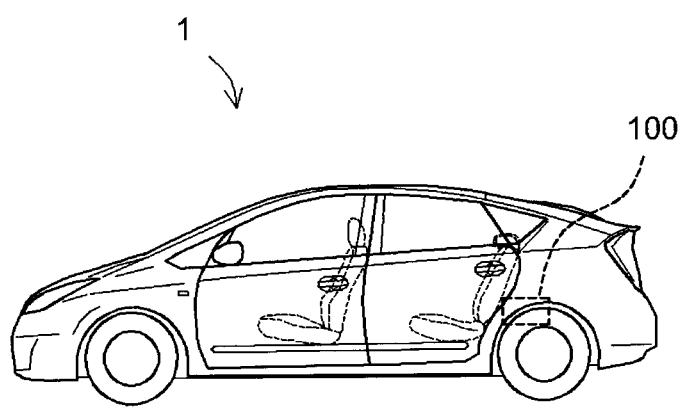
FIG. 6 is a side view of a vehicle (automobile) equipped with the lithium-ion secondary battery of the invention.

In addition to the aforementioned characteristics derived from the use of a two-phase coexisting compound as the positive electrode active material, the two-phase coexisting lithium-ion secondary battery disclosed here can be durable enough to withstand severe charge-discharge cycles as discussed above because a layered Li oxide is compounded in the positive electrode active material. It can thus be used favorably as a motor power source in an automobile or other vehicle. This secondary battery can also be used in the form of an assembled battery comprising multiple batteries arrayed in series and/or in parallel. Thus, as schematically shown in FIG. 5, the present invention also provides a vehicle (typically an automobile, especially a hybrid automobile, electric automobile, fuel cell automobile or other automobile equipped with a motor) 1 having this lithium-ion secondary battery (which may be in the form of an assembled battery) 100 as a power source.

The mechanism that makes the two-phase coexisting lithium-ion secondary battery disclosed here less liable to deterioration in battery performance in an endurance test at the vehicular level does not need to be explained in order to implement the present invention, but may be as follows.

As discussed above, although in a two-phase coexisting lithium-ion secondary battery the potential during charging remains roughly constant and most of the theoretical capacity is usable because there is no intermediate phase containing dispersed lithium ions, the voltage can rise rapidly and an overcharge state can occur because most of the lithium ions are in a released condition in the positive electrode at the end of charge. This overcharge state is more likely to occur in a vehicular endurance test, and can cause severe performance deterioration (corrosion of the positive electrode collector, deposition of lithium on the negative electrode surface and the like).

By contrast, in a two-phase coexisting lithium-ion secondary battery having a layered Li oxide compounded in the positive electrode active material, there is a charge-discharge potential difference between the two-phase coexisting compound and the layered Li oxide, and because the potential of the former is lower than the potential of the latter, the battery as a whole has a two-stage charge-discharge potential. The aforementioned "shoulder" appears in the charging curve as a result, making the voltage rise at the end of charge gentle and graduated. In other words, the lithium ions in the layered Li oxide are maintained as a reserve tank that is not used until the end of charge, and once the lithium ions in the two-phase coexisting compound are depleted and the voltage begins to rise at the end of charge, the lithium ion deficit is made up by the lithium ions in the reserve tank. Also, with a layered Li oxide the potential rises gradually during charging because the lithium ions diffuse as charging progresses. This makes the voltage rise at the end of charge gentle and graduated, thereby controlling electrode overcharge and reducing battery deterioration.

Because further reducing the average particle diameter of the layered Li oxide gives the particles a more uniform (denser) distribution, the lithium ion deficit in the positive mix layer can be mitigated more rapidly and uniformly. Thus, a difference in average particle diameter can produce a difference in effectiveness even with the same compounded amount. By using a smaller compounded amount of a layered Li oxide with a smaller average particle diameter, it is possible to obtain not only a satisfactory voltage rise mitigation effect (i.e., a capacity deterioration suppression effect), but also the effect of increasing the amount of electricity that can be charged while maintaining a constant voltage.

Some examples of the present invention are explained below, but there is no intention to limit the present invention to what is shown in these examples.

Example 1

$LiFePO_4$ was synthesized by hydrothermal synthesis in accordance with known literature (Kaoru Dokko et al., Journal of Power Sources Vol. 165, pp. 656-659, 2007). The resulting $LiFePO_4$ was made into particles with an average particle diameter of about 0.7 μm in a ball mill.

Next, the surfaces of the resulting $LiFePO_4$ particles were carbon coated in accordance with Japanese Patent Application Laid-open No. 2008-311067. That is, a $LiFePO_4$-polyvinyl alcohol aggregate with an average particle diameter of 20 μm was obtained with a turning fluidized bed system from a slurry composition comprising 5 mass parts of polyvinyl alcohol added to 100 mass parts of $LiFePO_4$ and dissolved in water. This was baked for 1.5 hours at 800° C. in a hydrogen atmosphere to reduce and carbonize the polyvinyl alcohol and obtain carbon-coated $LiFePO_4$.

A binder (PVDF) was added to the resulting carbon-coated $LiFePO_4$ (Compound A) to obtain a $LiFePO_4$:carbon coat: PVDF mass ratio of 88:2:10, and this was then pulverized and kneaded uniformly in a bead mill using NMP as the dispersion medium to obtain a positive electrode mix in the form of a slurry with a solids content (NV) of 40 mass %. $LiNi_{1/3}Mn_{1/3}Co_{1/3}O_2$ (Compound B) with an average particle diameter of 1 μm was added to this positive mix to a mass ratio A:B of 90:10 of Compound A to Compound B, and the two were mixed thoroughly.

This positive electrode mix was coated on both sides of a 10.0 cm×100 cm aluminum foil about 15 μm thick (positive electrode collector) to a coated amount (NV basis) of about 30 $mg/m^2$ on both surfaces. This was dried, and pressed to a total thickness of about 150 μm to obtain a positive electrode sheet.

For the negative mix, natural graphite powder, SBR and CMC were mixed with ion-exchange water to a mass ratio of 95:2.5:2.5 of the three materials and a NV of 45 mass % to prepare a slurry composition. This negative mix was coated on both sides of a 10.5 cm×100 cm copper foil (negative electrode collector) about 12 μm thick. This was dried, and then pressed to a total thickness of 100 μm to obtain a negative electrode sheet.

The resulting positive electrode sheet and negative electrode sheet were superimposed with two 20 μm-thick polypropylene/polyethylene porous composite sheets and wound, the resulting wound electrode body was contained together with an electrolyte solution in a container with a 100 mL internal capacity constructed with an accessible positive electrode terminal and negative electrode terminal, and the container was sealed to obtain the battery of Example 1. A solution of $LiPF_6$ dissolved at a concentration of 1 mol/L in a mixed solvent of EC, DMC and EMC with a volume ratio of 1:1:1 was used as the electrolyte solution.

As conditioning treatment, the battery was subjected to constant-current charge at a rate of ⅕ C, after which the operation of charging at a rate of ⅓ C up to 4.1 V and the operation of discharging at a rate of ⅓ C down to 3.0 V were repeated three times to obtain the battery of Example 1. 1 C here is an amount of current capable of charging the battery capacity (Ah) as predicted from the theoretical capacity of the positive electrode in 1 hour.

Example 2

The battery of Example 2 was obtained as in Example 1 except that the mass ratio of Compound A and Compound B in the positive electrode active material was 95:5.

Example 3

The battery of Example 3 was obtained as in Example 1 except that the mass ratio of Compound A and Compound B in the positive electrode active material was 97:3.

Example 4

The battery of Example 4 was obtained as in Example 1 except that the mass ratio of Compound A and Compound B in the positive electrode active material was 99:1.

Example 5

The battery of Example 5 was obtained as in Example 1 except that $LiNi_{1/3}Mn_{1/3}Co_{1/3}O_2$ with an average particle diameter of 10 μm was used.

Example 6

The battery of Example 6 was obtained as in Example 2 except that $LiNi_{1/3}Mn_{1/3}Co_{1/3}O_2$ with an average particle diameter of 10 μm was used.

Example 7

The battery of Example 7 was obtained as in Example 3 except that $LiNi_{1/3}Mn_{1/3}Co_{1/3}O_2$ with an average particle diameter of 10 μm was used.

Example 8

The battery of Example 8 was obtained as in Example 4 except that $LiNi_{1/3}Mn_{1/3}Co_{1/3}O_2$ with an average particle diameter of 10 μm was used.

Example 9

The battery of Example 9 was obtained as in Example 1 except that only $LiFePO_4$ was used (that is, no $LiNi_{1/3}Mn_{1/3}Co_{1/3}O_2$ was used).

Voltage Gradient Measurement Test

The batteries of Example 5 and Example 9 were adjusted to SOC 0%, and charged from SOC 0% to SOC 100% at a rate of 0.2 C and a temperature of 20° C., the change in voltage values (charging curve) was recorded during that time, and the differential value dV/d (SOC) of the charging curve was calculated as the voltage gradient. FIG. 4 and FIG. 5 are graphs showing the charging curves and voltage gradients for these examples.

Charge-Discharge Cycle Test

Each battery was subjected to 1000 repeated cycles of a charge-discharge cycle in which the battery was charged at 2 C to an inter-terminal voltage of 4.1 V, and then discharged at 2 C from 4.1 V to 2.5 V at 60° C.

Capacity Retention

Before and after the aforementioned cycle testing, each battery was adjusted to SOC (State of Charge) 100% and then discharged at a rate of 0.2 C to SOC 0% at 25° C., and the discharge capacity was measured. The capacity retention (%) was determined as the ratio of the discharge capacity after endurance testing to the discharge capacity before endurance testing, given as a percentage.

To show relative improvement in capacity retention, the difference (0.5%) between the capacity retention (82%) of the battery of Example 9, which used no layered Li oxide, and the capacity retention (82.5%) of the battery of Example 4 (average particle diameter 10 μm, compounded amount 1 mass %) was given as standard value 1, and the relative improvement in the capacity retention of each battery relative to this standard value was calculated as the relative improvement in capacity retention.

For the batteries of Examples 1 to 9, these results are shown in Table 1 together with the average particle diameter (μm) of the layered Li oxide in each battery and the compounded ratio (mass %) relative to the total of the positive electrode active material.

TABLE 1

| | Layered Li oxide | | Capacity retention (%) | Relative improvement in capacity retention |
|---|---|---|---|---|
| Example | Average particle diameter (μm) | Compounded ratio (mass %) | | |
| 1 | 1 | 10 | 89 | 14 |
| 2 | 1 | 5 | 88 | 12 |
| 3 | 1 | 3 | 87 | 10 |
| 4 | 1 | 1 | 85.5 | 7 |
| 5 | 10 | 10 | 85 | 5 |
| 6 | 10 | 5 | 84 | 4 |
| 7 | 10 | 3 | 83 | 2 |
| 8 | 10 | 1 | 82.5 | 1 |
| 9 | — | 0 | 82 | — |

As shown in Table 1, the batteries of Examples 1 to 8 using a two-phase coexisting compound ($LiFePO_4$ here) and a layered Li oxide ($LiNi_{1/3}Mn_{1/3}Co_{1/3}O_2$ here) as the positive electrode active material had improved capacity retention after charge-discharge cycle testing in comparison with the battery of Example 9. In particular, the batteries of Examples 1 to 4 using a layered Li oxide with an average particle diameter of 1 μm had about 3 to 7 times the capacity retention of the batteries of Examples 5 to 8 using a layered Li oxide with an average particle diameter of 10 μm. Specifically, with the same compounded amount of 1 mass %, the capacity retention when the average particle diameter was 1 μm (Example 4) was 7 times the capacity retention when the average particle diameter was 10 μm (Example 8). Similarly, comparing the relative improvement with an average particle diameter of 1 μm and an average particle diameter of 10 μm, the capacity retention with a compounded amount of 3 mass % in the former case (Example 3) was 5 times that in the latter case (Example 7), while the capacity retention with a compounded amount of 5 mass % in the former case (Example 2) was 3 times that in the latter case (Example 6), and the capacity retention with a compounded amount of 1 mass % in the former case (Example 1) was about 3 times that in the latter case (Example 5), indicating a stronger capacity deterioration suppression effect. For example, greater capacity retention was obtained using a layered Li oxide with an average particle diameter of 1 μm in the compounded amount of 1 mass % than using a layered Li oxide with an average particle diameter of 10 μm in the compounded amount of 5 mass %.

Moreover, as shown in FIG. 5, the battery of Example 9 using only a two-phase coexisting compound as the positive electrode active material exhibited a rapid voltage rise exceeding a voltage gradient of 0.125 at the end of charge. By contrast, as shown in FIG. 4, the battery of Example 5 using a layered Li oxide maintained a flat charging curve until after SOC 80%, and exhibited a gradual voltage rise with a voltage gradient of 0.125 or less (about 0.075 or less in this case) near the end of charge (in the range of SOC 80% to 100% in this case). Meanwhile, the battery of Example 4 using a layered Li oxide with an average particle diameter of 1 μm in 1/10 the compounded amount of the battery of Example 5 exhibited a longer flat area of the charging curve (that is, closer to SOC 100%), indicating that more electricity can be charged at a constant voltage.

Specific examples of the present invention were explained above, but these are only examples, and do not limit the scope of the claims. The technology described in the claims encompasses various modifications and changes to the specific examples given above.

INDUSTRIAL APPLICABILITY

The lithium-ion secondary battery of the present invention can be used as a power source in various applications. In particular, it can be used favorably as a vehicle-mounted battery because cost savings are provided by the two-phase coexisting compound used as a positive electrode active material, and because it exhibits excellent durability with respect to charge and discharge under severe conditions. It can also be used favorably in the form of a vehicle equipped with the secondary battery.

REFERENCE SIGNS LIST

1 Vehicle (automobile)
20 Wound electrode body
30 Positive electrode sheet (positive electrode)
32 Positive electrode collector
35 Positive mix layer
40 Negative electrode sheet (negative electrode)
42 Negative electrode collector
45 Negative mix layer
50A, 50B Separators
100 Lithium-ion secondary battery

The invention claimed is:

1. A lithium-ion secondary battery comprising an electrode body having a positive electrode containing a positive electrode active material and a negative electrode containing a negative electrode active material, and a non-aqueous electrolyte solution containing a lithium salt in an organic solvent,
wherein the positive electrode active material contains 95 mass % or more and 99.9 mass % or less of a two-phase coexisting compound containing lithium, and also contains 0.1 to 5 mass % of particles of a lithium-transition metal oxide with a layered structure,
the two-phase coexisting compound is an olivine compound represented by the following General Formula (I):

$$Li_xFe_{1-y}M_yZO_4 \quad (I)$$

wherein M is at least one selected from the group consisting of Mn, Mg, Ni, Co, Cu, Zn, Ge, Cr, V, Nb, Mo, Ti and Ga, Z is P or Si, x satisfies $0.05 \leq x \leq 1.2$, and y satisfies $0 \leq y \leq 0.5$,
the layered lithium-transition metal oxide particles have a composition represented by the following General Formula (II):

$$LiNi_{0.3+m}Mn_{0.3+n}Co_{0.4-m-n}O_2 \quad (II)$$

wherein m satisfies $0 \leq m \leq 0.4$ and n satisfies $0 \leq n \leq 0.4$, and the layered lithium-transition metal oxide particles have an average particle diameter of 0.1 μm to 2 μm.

2. The lithium-ion secondary battery according to claim 1, wherein a differential value dV/d (SOC) of 0 or more and 0.125 or less of an SOC-voltage curve within an SOC range of 50% to 100% is maintained in a voltage gradient measurement test in which the battery is charged from SOC 0% to SOC 100% at a constant current of 0.2 C and a temperature of 20° C.

3. A vehicle comprising the lithium-ion secondary battery according to claim 1.

4. A lithium-ion secondary battery comprising an electrode body having a positive electrode containing a positive electrode active material and a negative electrode containing a negative electrode active material, and a non-aqueous electrolyte solution containing a lithium salt in an organic solvent, wherein
the positive electrode active material contains 95 mass % or more and 99.9 mass % or less of a two-phase coexisting compound containing lithium, and also contains 0.1 to 5 mass % of particles of a lithium-transition metal oxide with a layered structure,
the layered lithium-transition metal oxide particles have an average particle diameter of 0.1 μm to 2 μm,
the two-phase coexisting compound is an olivine compound represented by the formula $Li_xFeZO_4$
wherein Z is P or Si, and x satisfies $0.05 \leq x \leq 1.2$, and
the layered lithium-transition metal oxide particles have a composition represented by the formula $LiNi_{0.3+m}Mn_{0.3+n}Co_{0.4-m-n}O_2$
wherein m satisfies $0 \leq m \leq 0.4$ and n satisfies $0 \leq n \leq 0.4$.

* * * * *